United States Patent Office 3,018,238
Patented Jan. 23, 1962

3,018,238
METHOD OF FORMING A FUEL ELEMENT
FOR A NUCLEAR REACTOR
Edwin H. Layer, Jr., Columbus, and Charles S. Peet, Galena, Ohio, assignors to the United States of America as represented by the United States Atomic Energy Commission
No Drawing. Filed Dec. 29, 1959, Ser. No. 862,737
4 Claims. (Cl. 204—154.2)

This invention relates in general to the preparation of assemblies wherein a metal is bonded to a metal oxide. The invention finds particular application in the preparation of an assembly wherein zirconium or an alloy thereof such as Zircalloy-II is bonded to uranium oxide and will be described in connection with the preparation of Zircalloy-II-clad uranium dioxide fuel elements for a nuclear reactor.

Uranium dioxide as a fuel material and Zircalloy-II as a cladding material have established utility in the nuclear reactor art. Unfortunately, zirconium and Zircalloy-II cannot be bonded directly to a body consisting of uranium dioxide because zirconium begins to react with uranium dioxide at about 1100° F. and extensive reaction occurs at 1500° F. at which temperature the bonding operation is carried out. Not only do the surface atoms react but the oxygen from the uranium dioxide diffuses through the zirconium resulting in a reaction product possessing poor corrosion resistance in pressurized water.

It is accordingly necessary to provide a diffusion barrier between the cladding and the core of the fuel element. One barrier which has been suggested is a layer of sprayed and buffed graphite 100 to 200 microinches thick. Such a layer performs its assigned function of preventing diffusion but suffers from the difficulty that great care must be taken in handling the coated body to prevent contamination of the bonding surfaces. There is a great tendency for the graphite from the coated body to smear on the bonding surfaces and any Zircalloy surface which was contaminated will not bond metallurgically to another Zircalloy surface during the bonding operation.

It is an object of the present invention to develop a novel method of bonding a metal to a metal oxide while preventing diffusion of oxygen from the metal oxide into the metal.

It is a more specific object of the present invention to develop a new method of preparing a fuel element for a nuclear reactor in which a barrier separates the oxide core from the metal cladding.

And finally, it is the object of the present invention to develop a method of preparing a zirconium-clad uranium dioxide fuel element including a very thin layer of crystalline carbon between the uranium dioxide and the zirconium.

The invention consists broadly in roughening the surface of the uranium dioxide bodies forming the core of the fuel element, depositing a layer of carbon on the uranium dioxide by thermal decomposition of methane, and bonding the cladding to the core by gas pressure bonding.

The invention will be described specifically with reference to the preparation of fuel elements for the nuclear reactor described and claimed in patent application Serial No. 833,898, filed August 14, 1959 in the name of J. Sherman et al. This reactor includes fuel elements consisting of a receptacle plate which includes a latticework of Zircalloy-II cross ribs forming a plurality of compartments, each compartment containing a wafer of uranium dioxide, and a plate of Zircalloy-II covering both sides of the receptacle plate.

The uranium dioxide wafers were formed by a compacting and sintering process forming no part of the present invention. These wafers were provided with a 15 to 40-microinch thick coating of carbon by pyrolytic deposition. To accomplish this each wafer was first sandblasted to roughen the surface thereof and was then wiped clean to remove all loose particles. Six of these wafers were then placed in a fused-quartz boat. The boat was placed in a fused-quartz reaction tube placed in a temperature-controlled electrically heated furnace. The boat could be moved from a cold zone to a hot zone of the furnace without the introduction of air. The reaction tube was heated and the air flushed out with nitrogen. The boat was then pushed into the hot zone of the furnace and heated for 15 minutes. Methane was then introduced into the furnace and flowed through the furnace for 20 minutes. Then the boat was moved to the cool zone of the furnace and the methane turned off. The wafers were allowed to cool for five minutes and then removed from the furnace. The nitrogen was on at all times. It was found that it was necessary to keep the system free from air in order to prevent soot formation. The following table gives details of operating conditions of the process.

| | |
|---|---|
| $N_2$ (Mixing) | 200 cc./min. |
| $N_2$ (Flushing) | 170 cc./min. |
| $CH_4$ | 50 cc./min. |
| Time deposition | 20 min. |
| Time preheat | 15 min. |
| Time cool zone | 5 min. |
| Temperature hot zone | 1025° C. |

A total of 486 uranium dioxide wafers were processed by this procedure. Virtually all carbon films looked very good. The thickness and relative adherence were measured and it was found that the film was 15 to 40 microinches thick and showed good adherence. A notable fact is that this film is relatively thin with relation to the roughness of the wafer. And yet this film was thick enough to prevent reaction between the wafer and cladding.

Attempts to apply adherent coatings of this thickness to as-sintered wafers were unsuccessful. Seventy-three wafers were treated by the above procedure except that they were not sandblasted. These films were not adherent but flaked or rubbed off readily. Very thin adherent films could be formed by cutting the deposition time drastically; however, these films were not of sufficient thickness to perform the desired function. Likewise areas missed by the sandblasting showed evidence of peeling after deposition of the carbon film.

Likewise, attempts to obtain a thicker film were unsuccessful. A run on four uranium dioxide wafers as above, except with a deposition time of one hour, did not give satisfactory results since there was evidence of peeling of the carbon coating in all cases.

Wafers prepared as above were then assembled in fuel elements by placing the wafers in a Zircalloy-II receptacle plate and gas pressure bonding the wafers to the plate and the side plates to the cross ribs. This was carried out substantially as described in patent application Serial No. 687,842, filed October 2, 1957, by Henry A. Saller et al.

The fuel elements prepared were approximately 3.5 inches wide and 8 inches long with a thickness of 0.150 inch, consisting of a 0.100-inch thick receptacle plate and two 0.025-inch thick cladding plates. Each element contained thirty-two 0.100 by 0.250 by 1.500-inch uranium dioxide wafers. Each wafer was contained in an individual compartment formed by 0.035-inch wide cross ribs of Zircalloy-II. The compartmented receptacle plate was assembled entirely from strip components which had been surface-finished by machine belt abrasion.

Specifically, the 32 compartments of a fuel element were filled with uranium dioxide wafers prepared as described above. The compartmented receptacle plate was covered with cladding plates and then the edges of the cladding plates were fusion welded to the receptacle plate except for an evacuation opening. The fuel element was then evacuated and the evacuation opening sealed. Then the fuel element was pressure bonded in an autoclave. The autoclave was heated to a temperature of 1550° F. with a resistance heater located at the center of the autoclave and the specimens to be bonded were loaded within this heater. The bonding was carried out with helium at a pressure of 10,000 p.s.i. for four hours.

The fuel elements were evaluated by internal pressure burst tests, metallographic examination, and intercompartmental-leakage tests and corrosion tests of purposely defected compartments. The elements were consistently found to have strong bonds. The tests in all cases resulted in failure of the cladding rather than failure of the bond.

Corrosion tests in 680° F. water of elements containing defected compartments have been made. The elements show no growth after several weeks of exposure. Intercompartmental-leakage tests of the elements have revealed no communication between any of the compartments.

Metallographic examination of these elements shows that the elements have excellent metallurgical bonds showing grain growth across the original interface in all areas with a very minimum amount of bond-line contamination. No core-to-cladding reaction was observed.

One element was deliberately handled in a manner simulating the possible mishandling that might occur in production. It was found that it was not possible to transfer carbon from the cores to the surfaces of the ribs by rubbing. Therefore, contamination will not occur even though the element is mishandled in production. This feature plus the low cost of the process has led to the selection of this procedure for use in preparation of fuel elements on a production basis.

Another diffusion barrier with which we have experimented is one consisting of a layer of vacuum-evaporated chromium. Such a barrier is likewise acceptable but suffers a serious disadvantage from the point of view of cost and difficulty in carrying out the procedure.

Although the specific description has been restricted to the preparation of a fuel element containing uranium dioxide which is clad with an alloy of zirconium, the invention is equally applicable to other metallic oxides such as thorium dioxide and to other metals having a free energy of formation of their oxides equal to or higher than that of the oxide fuel and whose oxides are soluble in the metal lattice. Titanium is an example of such a metal.

To summarize, the procedure given herein makes it possible to prepare Zircalloy-clad fuel elements containing compartmented uranium dioxide fuel by the gas pressure-bonding technique. Elements produced behave well in corrosion tests, have consistently strong Zircalloy to Zircalloy bonds, possess complete compartment integrity, reveal good dimensional control, and demonstrate strong and ductile cladding. And finally, coatings on the core of pyrolytic crystalline carbon formed by the thermal decomposition of methane are satisfactory to prevent core-to-cladding reaction without introducing contamination on the Zircalloy bonding surfaces of the element.

It will be understood that this invention is not to be limited to the details given herein but that it may be modified within the scope of the appended claims.

What is claimed is:

1. In a method of preparing a fuel element for a nuclear reactor wherein a uranium dioxide core is clad with zirconium by gas pressure bonding, the improvement comprising sandblasting the uranium dioxide core to roughen the surface thereof and depositing a layer of carbon thereon which is thin compared to the surface roughness of the core by thermal decomposition of methane prior to the bonding step.

2. The improvement of claim 1 wherein the carbon layer is 15 to 40 microinches thick.

3. A method of forming a fuel element for a nuclear reactor comprising forming a body of uranium dioxide, sandblasting the body to roughen the surface thereof, exposing the body to an environment of methane at 1025° C. for 20 minutes whereby a coating of carbon 15 to 40 microinches thick is formed thereon, and cladding the body with an alloy consisting predominantly of zirconium by gas pressure bonding.

4. A method of forming a fuel element for a nuclear reactor comprising forming a plurality of sintered, compact wafers of uranium dioxide, sandblasting the wafers to roughen the surface thereof, exposing the wafers to methane gas at 1025° C. for twenty minutes whereby a coating of crystalline carbon 15 to 40 microinches thick is formed thereon, inserting the wafers in a receptacle plate of an alloy consisting predominantly of zirconium, covering the receptacle plate with cladding plates of the same alloy, fusion welding the edges of the cladding plates to the receptacle plate, and pressure bonding the fuel element with helium in an autoclave at a pressure of 10,000 p.s.i. for four hours at about 1500° F.

References Cited in the file of this patent

WAPD-MRP-68, PWP Report for April 24, June 23, 1957, pages 79–80.